United States Patent [19]

Booth

[11] Patent Number: 5,168,541
[45] Date of Patent: Dec. 1, 1992

[54] MOISTURE SEALING OF OPTICAL WAVEGUIDE DEVICES WITH DOPED SILICON DIOXIDE HAVING A SILICON MONOXIDE UNDERCOAT

[75] Inventor: Bruce L. Booth, West Chester, Pa.

[73] Assignee: E. I. Du Pont de Nemours and Company, Wilmington, Del.

[21] Appl. No.: 749,795

[22] Filed: Aug. 26, 1991

Related U.S. Application Data

[63] Continuation-in-part of Ser. No. 512,248, Apr. 20, 1990, abandoned.

[51] Int. Cl.⁵ .............................................. G02B 6/10
[52] U.S. Cl. .................................. 385/129; 385/130; 428/458; 156/625
[58] Field of Search .................... 385/49, 51, 129, 130, 385/131, 132; 156/625; 428/458

[56] References Cited

U.S. PATENT DOCUMENTS

| | | | |
|---|---|---|---|
| 3,442,686 | 5/1969 | Jones | 117/72 |
| 3,522,080 | 7/1970 | Dietzel | 117/232 |
| 3,808,027 | 4/1974 | Anderson et al. | 117/47 A |
| 4,312,915 | 1/1982 | Fan | 428/323 |
| 4,518,219 | 5/1985 | Leonberger et al. | 350/96.12 |
| 4,528,234 | 7/1985 | Kaiho et al. | 428/216 |
| 4,552,791 | 11/1985 | Hahn | 428/35 |
| 4,609,252 | 9/1986 | Wong et al. | 385/130 |
| 4,666,236 | 5/1987 | Mikami et al. | 385/51 |
| 4,702,963 | 10/1987 | Phillips et al. | 428/426 |
| 4,711,514 | 12/1987 | Tangonan et al. | 350/96.12 |
| 4,712,855 | 12/1987 | Tolksdorf et al. | 385/129 |
| 4,725,112 | 2/1988 | Bridges et al. | 350/96.12 |
| 4,737,015 | 4/1988 | Ishida et al. | 385/130 X |
| 4,867,516 | 9/1989 | Baken | 350/96.14 |
| 4,883,743 | 11/1989 | Booth et al. | 385/49 |
| 4,929,302 | 5/1990 | Valette | 156/657 |
| 5,015,059 | 5/1991 | Booth et al. | 385/49 |
| 5,016,958 | 5/1991 | Booth | 385/130 |
| 5,026,135 | 6/1991 | Booth | 385/130 |
| 5,084,356 | 1/1992 | Deak et al. | 428/458 |
| 5,085,904 | 2/1992 | Deak et al. | 428/35.7 |

FOREIGN PATENT DOCUMENTS

| | | |
|---|---|---|
| 60-244540 | 12/1985 | Japan . |
| 61-47244 | 3/1986 | Japan . |
| 62-156943 | 7/1987 | Japan . |
| 62-158677 | 7/1987 | Japan . |
| WO9002348 | 3/1990 | PCT Int'l Appl. . |
| 2191603A | 12/1987 | United Kingdom . |
| 2197881A | 6/1988 | United Kingdom . |

OTHER PUBLICATIONS

Chahroudi "Glassy Barriers from Electron Beam Web Coaters" May 4, 1989.
Sakamaki "Vapor Coating with Silicon Dioxide" May 2-3, 1989.

*Primary Examiner*—John D. Lee
*Assistant Examiner*—Phan T. Heartney

[57] ABSTRACT

This invention relates to organic optical waveguide devices which have improved barrier properties after having been coated with silicon monoxide, and then with silicon dioxide doped with certain metals.

15 Claims, 2 Drawing Sheets

MOISTURE SEALING OF OPTICAL WAVEGUIDE DEVICES WITH DOPED SILICON DIOXIDE HAVING A SILICON MONOXIDE UNDERCOAT

CROSS REFERENCES TO RELATED APPLICATIONS

This is a continuation-in-part of copending U.S. patent application Ser. No. 07/512,248, filed Apr. 20, 1990, now abandoned.

BACKGROUND OF THE INVENTION

1. Field of the Invention

This invention relates to organic optical waveguide devices which have improved barrier properties after having been coated with silicon monoxide, and then with silicon dioxide doped with certain metals.

2. Background of the Invention

In optical communication systems, messages are transmitted typically through optical fibers by carrier waves of optical frequencies that are generated by sources, such as lasers or light emitting diodes. There is much current interest in such optical communication systems because they offer several advantages over other communication systems, such as having a greatly increased number of channels of communication and the ability to use other materials besides expensive copper cables for transmitting messages.

As the development of optical circuits proceeded, it became necessary to have optical waveguide devices which could couple, divide, switch and modulate the optical waves from one optical fiber to another, or from one waveguide device to another.

Organic materials, especially photopolymers, are attractive materials for the fabrication of optical waveguide devices. Organic materials typically have low absorption in the visible and near infra-red regions of the spectrum. Photopolymers, in particular, can be prepared by conventional coating techniques and so can be reproducibly manufactured in large volume at reasonable cost. In contrast to most inorganic materials, which have fixed sets of properties, the properties of photopolymers can be varied over wide ranges by changes in composition. Custom designed materials can be formulated for specific applications. In the fabrication of optical waveguide devices, complex waveguides of small dimensions can be manufactured by exposure through photomasks. Elaborate crystal growing and doping techniques are not required.

However, devices fabricated from organic materials may suffer from sensitivity to environmental factors, such as moisture, in high humidity atmospheric conditions, and oxygen. Thus, it is desirable for the device to comprise a good barrier to oxygen and/or water vapor. However, the most common barrier materials, which are polymer based resins such as ethylene vinyl alcohol copolymer or polyvinylidene chloride, although exhibiting good barriers to oxygen or moisture, do so only under ideal conditions.

U.S. Pat. No. 3,442,686 discloses multilayer structures having good barrier properties to gases and liquids, comprising a flexible transparent organic polymeric base film having thereon an adherent, transparent, flexible highly gas- and liquid-impermeable, moisture resistant, continuous glassy coating of inorganic material, and a sealable, flexible, transparent top coating of organic material. The preferred base films disclosed include polyethylene terephthalate film. The preferred glassy coatings are oxides of silicon and aluminum. Among the silicon oxides disclosed are silicon monoxide (SiO) and silicon dioxide ($SiO_2$).

SiO is known to have better barrier properties than $SiO_2$, but unfortunately SiO is much more expensive than $SiO_2$. Effort has been made to use $SiO_2$ coatings instead of SiO for economic reasons To some extent, the barrier properties of $SiO_2$ can be improved by increased thickness, but there is a limit to this approach because of decreasing flexibility with increasing thickness.

U.S. Pat. No. 4,702,963 discloses a multilayer structure in which an adhesion layer is first vacuum deposited on a flexible polymer substrate, followed by vacuum deposition of a barrier layer. The adhesion layer can consist of Cr, which is preferred, Ta, Ni, Mo, oxides of Cr, alloys of Cr with Ta and Ni, codeposited mixtures of Cr and SiO having at least 20% by weight of Cr and a lead-alumina-silica glass composition. The patent discloses that the barrier is preferably silicon monoxide or silicon dioxide, and that when silicon dioxide is used, it may be mixed with glass modifiers such as oxides of Mg, Ba, and Ca, or with fluoride of alkaline earth metals, e.g., $MgF_2$ to alter the color appearance of the overall structure.

U.S. Pat. No. 4,528,234 discloses a transparent multilayer structure comprising a plastic film having a vacuum deposited layer thereon of Al, Sn, Fe, Zn and/or Mg and then a top layer of a carboxyl-containing polyolefin layer. The metal layer is thin enough that the structure is transparent and the metal layer effects a secure bond between the plastic film and the carboxyl-containing layer. The patent also discloses that a vacuum deposited layer of silicon oxide or titanium oxide on one or both sides of the plastic film improves the barrier properties of the structure. In the Examples, both silicon monoxide and silicon dioxide are used as the barrier layer.

Japanese patent publication 62-156943 discloses a multilayer structure of multiple layers of film and multiple layers of a vacuum deposited metal such as Al, Zn, Cu, Pt, In, Sn, Au, Ag, Sn or metal compound such as silicon oxide. The layers of vacuum deposited metal or metal compound are separated from one another by a layer of film and/or a layer of adhesive.

U.S. patent application Ser. No. 07/513,354, filed Apr. 20, 1990, now U.S. Pat. No. 5,085,904 describes a process for making packaging film by sequentially applying layers of SiO and $SiO_2$ to a resin substrate.

SUMMARY OF THE INVENTION

In one embodiment, this invention is directed to an optical waveguide assembly, said assembly having improved resistance to environmental effects, said assembly comprising:

(1) a optical waveguide device having a first surface, said device consisting essentially of organic material, said device comprising a region adapted to transmit light as an optical waveguide;
(2) a first barrier layer on said first surface, said first layer having a second surface, said first layer consisting essentially of:
 (a) SiO or
 (b) SiO and $SiO_2$, wherein the atomic ratio of oxygen to silicon in said first layer is less than about 1.4, based on the total weight of and wherein said first layer is about 10 to about 75 nm thick; and (3) a second barrier layer on said second surface, said second layer having a third surface, said second layer consisting essentially of:
(a) SiO$_2$ or
(b) SiO$_2$ and a metallic dopant dopant selected from the group consisting of titanium, zirconium, zinc, aluminum, indium, lead, tungsten, copper, tin, chromium, iron, manganese, antimony, cobalt, barium, and magnesium, wherein said metallic dopant comprises about 0.5% to about 30% of said second layer based on the total weight of said second layer, and
wherein said second layer is at least 20 nm thick.

In another embodiment, this invention is a process for making the assembly.

BRIEF DESCRIPTION OF THE DRAWINGS

The invention can be more fully understood from the following detailed description thereof taken in connection with the accompanying drawings which from a part of this application and in which.

DETAILED DESCRIPTION OF THE PREFERRED EMBODIMENT

Throughout the following detailed description, similar reference numerals refer to similar elements in all figures of the drawings.

This invention relates to an optical waveguide assembly with improved resistance to environmental effects comprising, in order: an organic optical waveguide device, a silicon monoxide barrier layer, and a silicon dioxide barrier layer. The silicon dioxide layer may be doped with certain metals. The assembly may also comprise additional protective layers.

Figure 1:
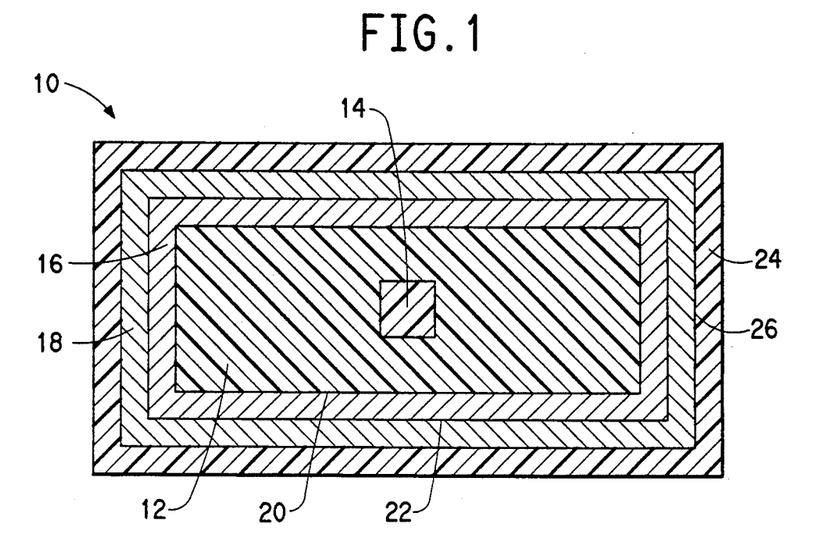
FIG. 1 is a cross-section of an organic waveguide assembly.
Figure 2:
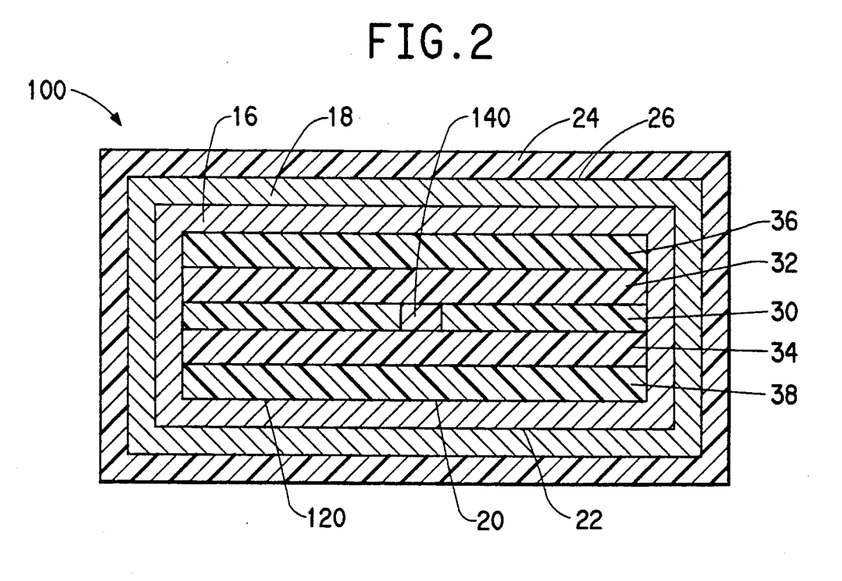
FIG. 2 is a cross-section of an organic waveguide assembly having a multilayer organic polymeric waveguide device.

FIG. 1 depicts a cross-section of a waveguide assembly of this invention generally indicated by reference character 10. An alternative embodiment of a waveguide assembly 100 in accordance with the invention is depicted in FIG. 2. Assembly 10 or 100 may itself be part of an integrated optical network.

Assembly 10 comprises an organic optical waveguide device 12 with embedded optical waveguide 14. Organic optical waveguide devices suitable for use in the present invention are described, for example, in Chandross, U.S. Pat. No. 3,809,732; Chandross, U.S. Pat. No. 3,993,485; Wong, U.S. Pat. No. 4,609,252; Mikami, U.S. Pat. No. 4,666,236; T. Kurokawa and S. Oikawa, *Applied Optics*, 16, 1033 (1976); H. Franke, *Appl. Opt.*, 23, 2729 (1984); and B. Booth, *J. Lightwave Technology*, 7, 1445 (1989).

In order to improve the resistance of organic optical waveguide devices to the environment, a first barrier layer 16 and a second barrier layer 18 are sequentially applied to the device 12. Referring again to FIG. 1, the assembly 10 comprises the first barrier layer 16 surrounding the device 12. The first barrier layer 16 is surrounded by the second barrier layer 18.

The first barrier layer 16 consists essentially of: (a) SiO or (b) SiO and SiO$_2$, wherein the atomic ratio of oxygen to silicon in said first layer is less than about 1.4. The second barrier layer 18 consists essentially of: SiO$_2$ or (b) SiO$_2$ and a metallic dopant, said metallic dopant selected from the group consisting of titanium, zirconium, zinc, aluminum, indium, lead, tungsten, copper, tin, chromium, iron, manganese, antimony, cobalt, barium, and magnesium. The metallic dopant comprises about 0.5% to about 30% of the second layer 18 based on the total weight of the layer 18.

Preferably, a surface 20 of the device 12 which will receive the first barrier layer 16, will be smooth, e.g., having a surface roughness of less than about 50 nm as measured by an optical profilometer, obtainable for example from Wyco. If the surface 20 of the device 12 is not smooth or if additional protection is desired, the device 12 may additionally comprise a layer of polymer film (not illustrated), such as polyethylene terephthalate film.

Vacuum deposition of the materials, e.g., SiO and SiO$_2$, to form barrier layers 16 and 18 on the device surface 20 can be carried out by conventional processes, such as by evaporation of the silicon oxide or sputtering. The evaporative process can be performed using thermal processes such as resistance heating, electron beam heating, or induction heating of the silicon oxide source in a vacuum chamber. This causes the source to vaporize and then deposit on the surface of the device 12. In sputtering, an ion beam or magnetically confined plasma (magnetron) displaces material from the silicon oxide target, causing this displaced material to deposit on the waveguide device surface 20. Sometimes these processes are referred to as vapor deposition, but the term "vacuum deposition" is used herein to describe these processes, since both the evaporative process and sputtering are carried out in a vacuum.

Device 12 is positioned in a chamber within which a vacuum is drawn. The silicon oxide source is placed in the vacuum chamber and then exposed to the evaporative or sputtering process. The oxide displaced from the source then forms the coating on device surface 20. The thickness of coatings 16 and 18 is determined by the amount of silicon oxide or silicon dioxide displaced from the target relative to the area of the device or devices present in the chamber.

The first barrier layer (e.g., the SiO coating) is deposited on the device surface 20 first, followed by deposition of the second barrier layer (e.g., the SiO$_2$ coating) onto surface 22 of the first barrier layer 16. In a continuous process, this will be carried out in successive vacuum chambers or in successive vacuum deposition stations in a single vacuum chamber. The same station may be used in a batch process, with the SiO target being replaced by the SiO$_2$ target.

Sufficient vacuum is drawn within the vacuum chamber so that the free path of the silicon oxide or silicon dioxide molecules is sufficient to reach and therefore enable deposition of the SiO and SiO$_2$ layers on surfaces 20 and 22, respectively. The vacuum used in the experiments described in the Examples herein generally fell within the range of about 1 to 100 microtorr (760 torr = 1 atm) and this range of vacuum should generally be sufficient depending of the distance between the source and device 12. The greater the distance, the higher the vacuum needed, e.g., 1-50 microtorr. In the first barrier layer 16, SiO is the essential component. Chromium as required in the adhesion layer in U.S. Pat. No. 4,702,963 when SiO is used therein is not required in the present invention. The SiO need not be entirely monoxide, however, since a minor proportion of SiO$_2$ may be present either by virtue of carrying out the vacuum deposition in the presence of oxygen or by having SiO₂ present as a minor proportion of the SiO target. The SiO₂ diluent in the first barrier layer 16 tends to eliminate any perceptible yellow color from the greater thicknesses within the 10 to 75 nm layer thickness range employed in the present invention. As thickness of the SiO layer increases within this range, both the tendency towards yellow coloration and cost increase, which can be essentially offset by incorporating a minor proportion of SiO₂ in first barrier layer 16 or by other means increasing the atomic ratio of oxygen to silicon. Preferably, the ratio of oxygen to silicon in the first barrier layer does not exceed about 1.4 and more preferably, does not exceed 1.25. These oxygen/silicon ratios, i.e., in the range of 1:1.40, can be accomplished by including SiO₂ along with SiO in the vacuum deposition process. Excessive amounts of SiO₂ or greater proportions of oxygen in the first barrier layer 16 tend to detract from barrier properties of the combined layers. It is essential that some thickness of the first barrier layer 16 be present, since it is the combination of the first barrier layer 16 and the second barrier layer 18 on the device surface 20 that provides the desirable barrier properties. The preferred thickness for the first barrier layer is about 10 to 50 nm.

Second barrier layer 18 will generally not require a thickness of greater than about 500 nm (5000 Angstroms) and preferably has a thickness of about 50 to 350 nm (500 to 3500 Angstroms). Second barrier layer 18 also preferably is "doped" with an effective amount of metallic material which improves the barrier properties of the layer 18 during retorting, e.g., prolonged contact with boiling water under pressure at temperatures at least 125° C., as compared to barrier properties without dopant being present, and preferably substantially stabilizes the barrier properties so that they do not appreciably deteriorate upon retorting. For demanding barrier utilities, the doped second barrier layer 18 in combination with the first barrier layer 16 provides results equivalent to SiO at similar overall thickness but without the high cost of SiO.

Magnesium and barium modifiers for SiO₂, disclosed in U.S. Pat. No. 4,702,963, in fact improve the barrier property of the second barrier layer 18. Certain materials not disclosed in that patent, such as titanium, zirconium, zinc, aluminum, indium, lead, tungsten, copper, tin, chromium, iron, manganese, antimony, and cobalt, or oxides, halides, such as chlorides and fluorides, and carbonates, thereof or mixtures thereof vacuum deposited with the vacuum deposition of the second barrier layer 18 also similarly improve the barrier properties of layer 18. Generally the effective amount of metal dopant which improves the barrier properties of second barrier layer 18 will be within the range of about 0.5 to 30% based on the total weight of layer 18, and preferably 2 to 15% based on the weight of layer 18, depending on the particular dopant used and the barrier result desired.

The dopant can be incorporated into layer 18 either by evaporating a single source of a physical or fused mixture of the dopant and SiO₂, or by co-depositing the dopant and the SiO₂ from two or more sources simultaneously. In both cases, the dopant can be in a metallic form, or in the form of an oxide, silicide, silicate, halide or carbonate and the like. In the case of depositing from a single source, the proportion of the dopant present in the deposited SiO₂ comprising layer 18 may vary from the composition of the source. Such proportion can be determined for a particular source composition and conditions of vacuum deposition and can be adjusted to the proportion desired by adjustment of the source composition. In case of either deposition method, the composition of the coating can be determined by analysis of atomic absorption using inductively coupled plasma (ICP), which is a conventional analysis procedure. This analysis primarily detects the elemental metal in the SiO₂. Therefore, the weight percents of dopant disclosed herein are based on the elemental metal of the metal dopant. Thus, decomposition products, e.g., carbon dioxide from carbonates, which do not become part of second barrier layer 18 are not included in weight percents of dopant in the layer 18. The weight percents of dopant disclosed herein refer to the composition of layer 18 unless otherwise indicated. These same weight percents may, however, be present in the source(s) for vacuum deposition (co-deposition), and as previously described, the resultant composition of layer 18 for the vacuum deposition conditions used can then be determined, and the source composition can then be adjusted in subsequent runs to obtain the final SiO₂ composition desired. More often, the source composition will be adjusted to provide the barrier properties desired for the multilayer structure rather than to analyze layer 18 for its dopant content.

The oxidation state of the metal as it resides in the coating matrix of silicon dioxide is not necessarily clearly understood or well defined. Thus if an elemental metal is used as the source for the dopant, the deposited metal atoms or particles may interact with the oxygen atoms on the matrix to form a partially or completely oxidized material. Alternatively, if an oxide of the metal is used as the source, it is not necessarily known nor is it necessarily important whether the metal is deposited into the glassy matrix as the oxide or as the elemental metal.

Contrary to the light transmission results reported in U.S. Pat. No. 4,702,963, the light transmission of device assemblies prepared by this method are high, preferably not appreciably degrading the light transmission of the device. Second barrier layer 18, even containing metallic material dopant can be and is preferably colorless.

Assembly 10 may also comprise one or more additional protective layers, represented in FIG. 1 by single protective layer 24, to protect the integrity of barrier layers 16 and 18 against mechanical damage and to provide additional protection from environmental effects. Protective layer 24 can be selected from any plastic resin that adheres to surface 26 of second barrier layer 18 or that adheres to the second barrier layer 18 via an intervening adhesive layer (not represented). Preferably this adhesion will survive the environmental effects to which the assembly is subject.

Examples of protective layers include films of polyethylene terephthalate, polyvinylidene chloride, polyethylene, polypropylene, ethylene/vinyl acid copolymer, ethylene/acrylic or methacrylic acid copolymer, ionomer, copolymers of acrylonitrile, and polyamide. Protective layer 24 can be applied to surface 26 by conventional processes such as adhesive or thermal laminating. Protective layer 24 can also be provided by solvent or dispersion coating onto surface 26, using multiple coatings if thickness is greater than achievable by single coating is desired. The thickness of protective layer 24 will generally be about 0.5 to 100 microns thick, preferably 10 to 25 microns (0.010 to 0.025 mm).

Although any type of organic optical waveguide device having a waveguide may be used in accordance with this invention, multilayer devices constructed of photohardenable or photohardened waveguide and buffer layers highly benefit from the provisions of the instant invention and are preferred. FIG. 2 depicts a cross-section of an organic waveguide assembly 100 having a multilayer organic polymeric waveguide device 120 and embedded waveguide 140. Device 120 comprises a waveguide layer 30 which contains embedded waveguide 140, inner buffer layers 32 and 34, outer buffer layers 36 and 38, first barrier layer 16, and second barrier layer 18. One or more protective layers 24 may also be present.

Photohardenable waveguide layer 30 and buffer layers 32, 34, 36, and 38 are used in multilayer devices derived from thermoplastic compositions which upon exposure to actinic radiation forms crosslinks or polymers of high molecular weight to change the refractive index and rheological character of the composition(s). Preferred photohardenable materials are photopolymerizable compositions, such as disclosed in Haugh, U.S. Pat. No. 3,658,526. More preferred materials are disclosed in Monroe, U.S. Pat. No. 4,942,112; Smothers, U.S. Pat. No. 4,994,347, Trout, U.S. Pat. No. 4,963,471; and Keys, U.S. Pat. Nos. 4,942,102, 4,950,567, and 4,965,152. The composition of the preferred photosensitive elements adapted for the preparation of the preferred organic optical waveguide devices is described in Booth, U.S. Pat. No. 5,016,958, column 5, line 31 to column 8, line 65.

The preparation of multilayer organic polymeric optical waveguide devices from these materials and elements is disclosed in Booth, U.S. Pat. Nos. 4,883,743; 5,015,059; 5,016,958, and 5,026,135, particularly U.S. Pat. No. 5,026,135, column 5, line 4, to column 9, line 7.

Figure 3:
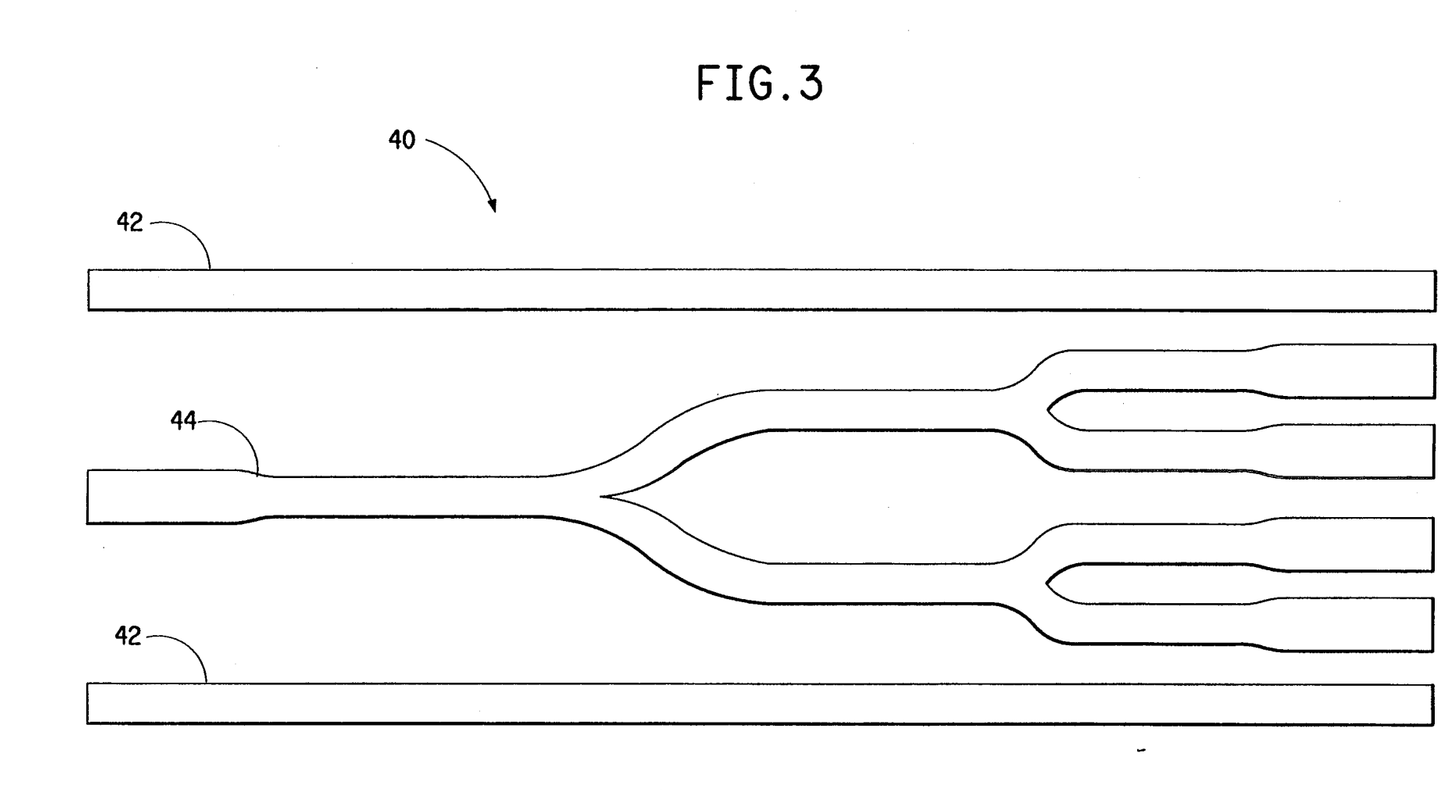
FIG. 3 shows a test pattern comprising two straight waveguides and one 1×4 splitter.

FIG. 3 shows a photomask 40 which has been used for evaluation purposes. It comprises two straight waveguides 42 and one 1×4 splitter 44. The dimensions and the radius of curvature (ROC) are shown in FIG. 3. Exposure through photomask 40 produces waveguide 140 in waveguide layer 30. The areas represented by 42 and 44 are transparent in the photomask, the rest of photomask 40 being opaque.

It should be understood that although, for simplicity purposes, FIG. 3 illustrates a photomask for making only elementary optical waveguide devices, the use of more complex devices in the practice of this invention is not precluded.

One measure of improved barrier properties is reduced oxygen transmission through a multilayer structure. Multilayer structures, consisting of the first barrier layer and the second barrier layer on a polymer film, can achieve barrier properties characterized by an oxygen transmission rate (OTR) of less than about 7 cc/m$^2$ Day Atm, preferably before and after retorting. The preferred oxygen transmission rate before and after retorting is less than about 3 cc/m$^2$ Day Atm. The oxygen transmission is measured on a Model "OX-TRAN 1000" made by Modern Controls Inc. of Minneapolis, MN at 30° C. and at 80% relative humidity, using 100% (1 Atm pressure) oxygen for the permeation tests, with the result being normalized to 1 m$^2$ of multilayer structure and one day's duration for the test. The retorting procedure used for these tests involves placing the multilayer structure in a bath of water in an autoclave under 2.5 Atm absolute pressure at 125° C. for 30 minutes in addition to the time for heating up (30 minutes) and cooling down (15 minutes) the water bath in which the multilayer structure is immersed. Such multilayer structures also exhibit low permeability to passage of water vapor, both before and after retorting.

EXAMPLES

The advantageous properties of this invention can be observed by reference to the following examples which illustrate, but do not limit, the invention. In these Examples, parts and percents are by weight unless otherwise indicated.

In order to more accurately characterize the barrier properties of the barrier layers, several examples were carried out in which the barrier layers were deposited on a polyethylene terephthalate film. The measured rates for water permeation through these coatings reflect the quality of achievable barrier on an optical waveguide device. The lower the measured permeation rate for the coating on the polyethylene terephthalate film, the better the barrier properties of the coating on an organic optical waveguide device.

EXAMPLE 1

This Example demonstrates the necessity of the SiO/SiO$_2$ multilayer combination in terms of barrier properties.

Layers of the silicon oxides were formed by electron beam evaporation on the side of Mylar ® D polyethylene terephthalate film (0.0234 mm thick) without slip nodules to form a barrier film.

Details of the electron beam evaporation procedure are as follows: the electron beam evaporator used was the type using a single crucible bent beam source. There are several different manufacturers of equipment providing this beam source, e.g., Leybold AG, Alzenau, West Germany; Balzers AG, Furstentum Liechtenstein; Temescal of Berkeley, CA; or Denton Vacuum of Cherry Hill, NJ, the latter being used in this Example.

The accelerator voltage was continuously adjusted to sweep the electron beam across the material in the crucible forming the hearth of the electron beam evaporator to give a uniform erosion of the crucible's silicon oxide contents. The filament current (and subsequently the beam current) was adjusted to give a high deposition rate which resulted in a relatively high background pressure of about $1 \times 10^{-4}$ torr. This pressure was not so high as to cause premature arc over of the electron beam gun. The thickness of the deposits were monitored by a calibrated oscillating quartz crystal monitor such as made by Veeco Instruments Inc., Plainview, NY, and the vacuum deposition process was stopped when the desired oxide layer thickness was reached. The results are shown in Table 1.

TABLE 1

| | Barrier Film Oxygen Permeability | | |
|---|---|---|---|
| | 1st barrier layer thickness (nm) | 2nd barrier layer thickness (nm) | OTR (no retort) (cc/m$^2$ Day Atm) |
| a. | 31 | 0 | 43.2 |
| b. | 0 | 355 | 10.1 |
| c. | 0 | 301 | 76.4 |
| d. | 0 | 303 | 77.1 |
| e. | 0 | 314 | 7.1 |
| f. | 0 | 300 | 84.3 |
| g. | 0 | 315 | 62.1 |
| h. | 30 | 202 | 1.1 |
| i. | 102 | 184 | 2.3 |
| j. | 35 | 237 | 1.2 |

TABLE 1-continued

| | Barrier Film Oxygen Permeability | | |
|---|---|---|---|
| | 1st barrier layer thickness (nm) | 2nd barrier layer thickness (nm) | OTR (no retort) (cc/m² Day Atm) |
| k. | 15 | 214 | 2.5 |

OTR is the cubic centimeters of oxygen transmitted across the multilayer structure in one day with a partial pressure difference of one atmosphere of oxygen, under the further conditions described hereinbefore. In this Example, the OTR was determined on unretorted barrier film.

Experiments h., j., and k. illustrate the barrier layer of the present invention and provide the lowest oxygen permeability, demonstrating the best barrier properties when the combination of SiO and $SiO_2$ layers are used.

Experiment a. shows that the thin layer of SiO by itself provides poor barrier properties on polyethylene terephthalate film. The film by itself exhibits an oxygen permeability of 75 cc/m² Day Atm.

Experiments b. through g. show that the thicker $SiO_2$ layers used by themselves (no SiO underlayer) provide variable oxygen permeability results as compared to Experiment a., i.e., sometimes better, sometimes worse.

The combination of SiO and $SiO_2$ layers, however, as shown in experiments h., j., and k. provides better barrier properties than demonstrated by either the SiO or $SiO_2$ layers used separately, with a more than 200% improvement over the best results exhibited by the $SiO_2$ layers used by themselves (on polyethylene terephthalate film).

Experiment i. demonstrates that thicker SiO and thinner $SiO_2$ layers may be used in the combination but at sacrifice in economy because of the greater cost of SiO as compared to $SiO_2$. The multilayer film structures of experiments h., j., and k. are transparent and colorless as are the film structures of experiments a. through g., while the film structure of experiment i. exhibits yellow coloration.

EXAMPLE 2

This example shows the effect of varying the stoichiometric ratio of oxygen to silicon in the SiO underlayer formed on a PET film. The multilayer structure: polyethylene terephthalate film/SiO/$SiO_2$, by the procedure of Example 1, using the polyethylene terephthalate film used in Example 1, with the following results:

TABLE 2

| Ratio of O/Si | 1st barrier layer thickness (nm) | 2nd barrier layer thickness (nm) | OTR[a] |
|---|---|---|---|
| 1.25:1 | 54 | 283 | 0.9 |
| 1.5:1 | 31 | 240 | >150 |

[a]After retorting; in cc/m² Day Atm

In the experiments addressed in Table 2, the second barrier layer was doped with Sn by vacuum deposition by electron beam evaporation of a 95/5 weight source mixture of $SiO_2$ and Sn. The first barrier layer was formed to contain the greater proportion of oxygen as indicated in Table 2 by mixing SiO and $SiO_2$ together in the weight ratio indicated to form a single source (target). The permeability testing was carried out after retorting of the film structure. Retorting was carried out by placement of the film structure in a bath of water in an autoclave at 125° C. for 30 minutes. From these results it can be seen that as the oxygen ratio increases in the first barrier layer, the retortability of the multilayer structure decreases.

EXAMPLE 3

In this layer, the film structure polyethylene terephthalate film/13 nm SiO/308 nm $SiO_2$+5% Cu was prepared and tested for oxygen permeability by the same procedure as Example 1, but after retorting by the procedure of Example 2. The resultant OTR was 2.8 cc/m² Day Atm indicating that a moderately thin first barrier layer serves to provide reasonably good barrier property in combination with the second barrier layer.

EXAMPLE 4

A 49 nm thick layer of SiO was formed onto a 92 gauge (0.0234 mm) "Mylar ® D" polyethylene terephthalate film by electron beam evaporation in a vacuum chamber as described in Example 1. The deposit was transparent and exhibited a yellow color which was barely perceptible. A second layer, 250 nm thick of $SiO_2$ mixed with 5% $MgF_2$ dopant (as the source in the hearth of the electron beam evaporator), was formed on top of the SiO layer by electron beam evaporation. The resultant barrier film was transparent, clear and colorless. This coated film was then retorted as described in Example 2. The retorted film's oxygen transmission rate (OTR) was 1.04 cc/m² Day Atm. The film retained the transparent, clear, and colorless appearance present in the unretorted film.

For comparison purposes, $SiO_2$ was mixed with 5% $MgF_2$. This mixture was loaded in the hearth as the source of an electron beam evaporator. A film of approximately 301 nm was formed directly onto a 92 gauge "Mylar ® D" polyethylene terephthalate film (on the side without the slip nodule additive) by electron beam evaporation from this mixture. The deposit was transparent and clear. This coated film was then retorted by placing it into a bath of water in an autoclave at 125° C. for 30 minutes. The retorted film's OTR was 94 cc/m² Day Atm, even greater than that of the base film without the $SiO_2$ layer. Furthermore, instead of being a clear film, the $SiO_2$ layer while still transparent, exhibited a great amount of crazing or many small cracks. Repetition of the experiment to obtain a $SiO_2$ layer 301 nm thick but without the $MgF_2$ dopant gave similarly poor barrier property, except that the $SiO_2$ layer had good adhesion to the PET film as indicated by high peel strength (152 g/cm), and was transparent and colorless, without any cracks or crazing being visible to the naked eye.

EXAMPLE 5

A 50 nm film of SiO was deposited onto a 92 gauge "Mylar ® D" polyethylene terephthalate film (on the side without the slip additive) by electron beam evaporation. The deposit was transparent. A second layer, 252 nm of $SiO_2$ mixed with 5% Sn dopant (in the hearth of the electron beam evaporator), was deposited on top of the SiO layer by electron beam evaporation. The film remained transparent and clear after this second deposit. This coated film was then retorted as described in Example 2. The retorted film's OTR was 0.65 cc/m² Day Atm and the film retained its transparency and clarity.

For comparison purposes, $SiO_2$ was mixed with 5% of Sn. This mixture was loaded in the hearth of an electron beam evaporator. A film of approximately 296 nm was formed onto a 92-gauge "Mylar ® D" polyethylene terephthalate film (on the side without the slip additive) by electron beam evaporation from this mixture. The deposit was transparent and clear. This coated film was then retorted as described in Example 2. The retorted film's OTR was 97 cc/m$^2$ Day Atm, greater than that of the base film by itself. Furthermore, instead of being a clear film, the glass deposit exhibited a great amount of crazing or many small cracks.

EXAMPLE 6

A number of barrier films of the structure polyethylene terephthalate film/SiO/SiO$_2$ were formed by vacuum deposition by the procedure of Example 1. The film was Mylar ® D and the second barrier layer contained various dopants (hearth compositions reported), and on which OTR values were obtained either before or after retorting in accordance with Example 2. The results are shown in Table 3.

TABLE 3

| | 1st barrier layer thickness (nm) | 2nd barrier layer thickness (nm) | 2nd barrier layer dopant (%) | OTR before retorting$^a$ | OTR after retorting$^a$ |
|---|---|---|---|---|---|
| (a) | 32 | 270 | 10 Cr | 0.93 | — |
| (b) | 35 | 280 | 10 Cr | — | 1.33 |
| (c) | 30 | 217 | 10 Fe | 7.49 | — |
| (d) | 330 | 272 | 10 Fe | — | 6.59 |
| (e) | 57 | 254 | 5 In | 0.42 | — |
| (f) | 50 | 252 | 5 In | — | 5.84 |
| (g) | 30 | 273 | 5 Mn | — | 3.27 |
| (h) | 31 | 273 | 10 Mn | — | 47.8 |
| (i) | 51 | 250 | 5 PbO | — | 4.37 |
| (j) | 26 | 278 | 5 SnO2 | 1.07 | — |
| (k) | 29 | 277 | 5 Zr | 5.07 | — |
| (l) | 26 | 279 | 20 Zr | 0.74 | — |
| (m) | 25 | 279 | 5 ZrO | 0.50 | — |

$^a$in cc/m$^2$ Day Atm

For experiment k., the PbO was supplied in the form of a fused glass designated SF-6 available from Schott Glass Technologies, Inc., Duryea, PA, and contained a small proportion of SiO$_2$.

Comparison of experiments a. with b. and c. with d. show stabilizing effect of the dopants in the amounts used on oxygen permeability before and after retorting. The element In was less effective in the amount used, but the result after retorting was still more than 10 times better than polyethylene terephthalate film by itself. Mn as the dopant in experiment g. produced a barrier film with a useful oxygen impermeability after retorting. While the OTR value for experiment h. suggests that too much Mn was present in the second barrier layer. Experiments j. through m. all gave barrier layers with useful oxygen impermeabilities.

EXAMPLE 7

In this Example, the SiO in the first barrier layer was replaced by SiO$_2$ to yield the following multilayer film structure: polyethylene terephthalate film/32 nm SiO$_2$/271 nm SiO$_2$+5% Cu (hearth compositions). The polyethylene terephthalate film was Mylar ® D. The vacuum deposition procedure of Example 1 was used and the retort procedure of Example 2 was used. The OTR of this structure after retorting was 92.5 cc/m$^2$ Day Atm. The structure was clear and transparent, giving no visual evidence that the oxygen barrier had failed. In addition, the SiO$_2$ layers were strongly adhered to the polyethylene terephthalate film as indicated by a peel strength of 144.5 g/cm exhibited by a nearly identical film.

EXAMPLE 8

This Example shows the high transparency and low water vapor transmission of a number of multilayer structures of the present invention prepared by the procedure of Example 1 using the polyethylene terephthalate film of Example 1, details of these structures and light transmissions being reported in Table 4 (light transmission) and Table 5 (water vapor transmission).

TABLE 4

| | Visible Light Transmission | | | |
|---|---|---|---|---|
| 1st barrier layer thickness (nm) | 2nd barrier layer thickness (nm) | dopant (wt %) | % Light Transmission | |
| | | | 400 nm | 550 nm |
| 24 | 271 | 5 Cu | 72.06 | 88.24 |
| 25 | 125 | 5 Sn | 77.61 | 87.36 |
| 50 | 252 | 5 Sn | 77.33 | 78.28 |
| 32 | 270 | 10 Cr | 77.74 | 89.85 |
| 30 | 272 | 10 Fe | 69.02 | 77.16 |
| 57 | 254 | 5 In | 75.60 | 88.47 |
| 30 | 273 | 5 Mn | 73.66 | 80.17 |

These light transmissions compare favorably with the light transmission of the polyethylene terephthalate film, which by itself exhibited light transmissions of 85.89% (400 nm) and 1.73% (550 nm) and especially favorably with the light transmissions of polyethylene terephthalate commodity packaging film, viz, 69.22% (400 nm) and 78.01% (550 nm). The transmission of the Sn, Fe, and Mn containing structures were measured after retorting by the procedure of Example 2.

TABLE 5

| 1st barrier layer thickness (nm) | 2nd barrier layer thickness (nm) | dopant (%) | water vapor transmission (g/m$^2$ from 90% rel. hum. to 50% rel. hum.)$^a$ |
|---|---|---|---|
| 32 | 272 | 5 Cu | 0.93 |
| 10 | 300 | 5 Cu | 2.48 |
| 27 | 277 | 5 Sn | 1.40 |
| 31 | 273 | 5 Cu | 1.24$^b$ |
| 36 | 281 | 5 Sn | 1.24$^b$ |
| 49 | 250 | 5 MgF$_2$ | 0.78$^b$ |

$^a$Before retorting unless otherwise indicated.
$^b$After retorting

EXAMPLE 9

A multilayer organic polymeric optical waveguide device 120 which includes two single waveguides and one 1×4 splitter was constructed in a photohardenable layer using the procedures described in Booth, U.S. Pat. Nos. 5,016,958 and 5,026,135. Device 120 consists of waveguide layer 30 having a nominal thickness of 7.5 micrometers, in which waveguide 140 was formed by exposure through the photomask depicted in FIG. 3. The nominal width of waveguide 140 was 7.5 micrometers at the input and 6 micrometers internal to the Y splitters. A nominal exposure of 20 millijoules/cm$^2$ was used. Waveguide layer 30 has the composition shown in Table 6.

Device 120 has inner buffer layers 32 and 34, one on each side of waveguide layer 30, having a nominal thickness of 26 micrometers each. The composition of inner buffer layers 32 and 34 is shown in Table 7. Outside of inner buffer layers 32 and 34 were outer buffer layers 36 and 38, each having a nominal thickness of 28 micrometers each. Their composition is shown in Table 8.

Both straight waveguides and the 1×4 splitter patterns were tested by taking power measurements with UDT Ge detector (United Detector Technology, Boston, MA) and model S380 power meter. The waveguide output was imaged on the detector with a Nikon Flour 100 mag oil lens with 1.3 NA (Model Ph4DL). Measurements regarding power loss were taken at 1300 nm and 1550 nm wavelengths using light sources from Lasertron QLM 1300SM501 and QLM 1550SM501 launched from an AT&T single-mode fiber.

After completion of the initial optical performance measurements, device 12 was coated on one side initially with SiO having a nominal thickness of 30 nanometers, to form first barrier layer 16, and then with $SiO_2$ containing 5% copper and having a nominal thickness of 300 nanometers, to form second barrier layer 18. The other side was coated exactly the same way, except that the copper was replaced by tin. The electron beam vacuum apparatus described in Example 1 was used. Device 12 was taped near the edges on a glass slide, and the glass slide was taped on a rotating drum having a nominal diameter of 13 cm.

Assembly 100, formed by coating device 120, was then retested, using the same conditions and apparatus for optical characterization noted above. No measurable degradation in performance was detected.

A drop of water was then placed on one of the surfaces of assembly 10 for 16 hours. Assembly 10 was again retested, using the same conditions and apparatus for optical characterization noted above. No measurable degradation was detected.

A drop of water was then placed on the other surface of the assembly 10 for 16 hours. The sample was once again retested, using the same conditions and apparatus for optical characterization noted above. No measurable degradation was detected.

A nominal loss of power due to the different types of losses before and after the conditions described above was of the order of 0.5 db per centimeter. If a drop of water was placed on an uncoated device, the power loss increased considerably, and a nominal loss value of 0.8 db was observed. In addition, observation of the near-field mode structure obtained by imaging the output of waveguide 14 on an infrared camera and displaying it on a video screen demonstrated no signs of background noise or changes from the previous measurements when the water drop test was used, if the barrier layers are present. The impact of water placed on similar, but uncoated samples was that the near-field image was progressively surrounded by increasing levels of scattered light as a result of water being diffused into the sample.

For the following tables, the following definitions apply:

o-Cl HABI 1,1'-Biimidazole, 2,2'-bis[o-chlorophenyl]-4,4',5,5'-tetraphenyl-; CAS 1707-68-2
MMT 4-Methyl-4H-1,2,4-triazole-3-thiol; CAS 24854-43-1
Photomer® 4039 Phenol ethoxylate monoacrylate; CAS 56641-05-5; Henkel Process Chemical Co.
Sartomer 349 Ethoxylated bisphenol A diacrylate; CAS 24447-78-7; Sartomer Company, West Chester, PA
CAB Cellulose acetate butyrate; Eastman
DEAW 2,5-Bis([4-(diethylamino)-phenyl]methylene) cyclopentanone
FC-430 Fluorinated nonionic surfactant; 3M, St. Paul, MN
TDMA Triethylene glycol dimethacrylate
BHT Butylated hydroxy toluene
Polyox® Polyethylene oxide, MW 400,00; Union WSRN-3000 Carbide, Danbury, CT

TABLE 6

Waveguide Layer

| | % by wt. |
|---|---|
| Polyox® WSRN-3000 | 1.00 |
| CAB 531-1 | 55.41 |
| Photomer® 4039 | 34.94 |
| Sartomer 349 | 4.99 |
| MMT | 1.90 |
| o-Cl HABI | 1.00 |
| DEAW | 0.55 |
| BHT | 0.01 |
| FC-430 | 0.20 |

TABLE 7

Inner Buffer Layer

| | % by wt. |
|---|---|
| Polyox® WSRN-3000 | 45.00 |
| CAB 531-1 | 55.92 |
| Photomer® 4039 | 23.45 |
| Sartomer 349 | 10.20 |
| o-Cl HABI | 0.97 |
| Ethyl Michler's Ketone | 0.49 |
| Benzophenone | 2.91 |
| TDMA | 5.10 |

TABLE 8

Outer Buffer Layer

| | % by wt. |
|---|---|
| CAB 381-20 | 45.50 |
| Photomer® 4039 | 20.00 |
| Sartomer 349 | 8.50 |
| TDMA | 20.00 |
| MMT | 1.50 |
| o-Cl HABI | 1.00 |
| Ethyl Michler's Ketone | 0.48 |
| Benzophenone | 3.02 |

Examples demonstrating the operation of the instant invention have been given for illustration purposes only, and should not be construed as restricting the scope or limits of this invention in any way. Having described the invention, we now claim the following and their equivalents.

What is claimed is:

1. An optical waveguide assembly, said assembly comprising:
    (1) an optical waveguide device having a first surface, said device consisting essentially of organic material, said device comprising an optical waveguide;
    (2) a first barrier layer on said first surface, said first layer having a second surface, said first layer consisting essentially of:
       (a) SiO or
       (b) SiO and $SiO_2$, wherein the atomic ratio of oxygen to silicon in said first layer is less than about 1.4, based on the total weight of said first layer, and wherein said first layer is about 10 to about 75 nm thick; and
    (3) a second barrier layer on said second surface, said second layer having a third surface, said second layer consisting essentially of:
       (a) $SiO_2$ or (b) SiO₂ and a metallic dopant, said metallic dopant selected from the group consisting of titanium, zirconium, zinc, aluminum, indium, lead, tungsten, copper, tin, chromium, iron, manganese, antimony, cobalt, barium, and magnesium, wherein said metallic dopant comprises about 0.5% to about 30% of said second layer based on the total weight of said second layer, and wherein said second layer is at least 20 nm thick.

2. The assembly of claim 1, wherein said first barrier layer is 10 to 50 nm thick and said second barrier layer is 50 to 350 nm thick.

3. The assembly of claim 2, wherein said device is a multilayer organic polymeric optical waveguide device.

4. The assembly of claim 3, wherein said multilayer device consists of photohardened layers.

5. The assembly of claim 2, wherein said atomic ratio is less than about 1.25.

6. The assembly of claim 1, wherein said second barrier layer consists essentially of $SiO_2$.

7. The assembly of claim 1, wherein said second barrier layer consists essentially of $SiO_2$ and a metallic dopant, said metallic dopant selected from the group consisting of titanium, zirconium, zinc, aluminum, indium, lead, tungsten, copper, tin, chromium, iron, manganese, antimony, cobalt, barium, and magnesium, wherein said metallic dopant comprises about 0.5% to about 30% of said second layer based on the total weight of said second layer.

8. The assembly of claim 7, wherein said first barrier layer is 10 to 50 nm thick, said second barrier layer is 50 to 350 nm thick, and said device is a multilayer organic polymeric optical waveguide device consisting of photohardened layers.

9. The assembly of claim 1, additionally comprising a protective layer on said third surface of said second barrier layer.

10. The assembly of claim 9, wherein said protective layer is a polymer film selected from the group consisting of polyethylene terephthalate, polyvinylidene chloride, polyethylene, polypropylene, ethylene/vinyl acid copolymer, ethylene/acrylic or methacrylic acid copolymer, ionomer, copolymers of acrylonitrile, and polyamide.

11. A process for making an optical waveguide assembly, said assembly comprising:
   (1) an optical waveguide device having a first surface, said device consisting essentially of organic material, said device comprising an optical waveguide;
   (2) a first barrier layer on said first surface, said first layer having a second surface, said first layer consisting essentially of:
      (a) SiO or
      (b) SiO and $SiO_2$, wherein the atomic ratio of oxygen to silicon in said first layer is less than about 1.4, based on the total weight of said first layer, and wherein said first layer is about 10 to about 75 nm thick; and
   (3) a second barrier layer on said second surface, said second layer having a third surface, said second layer consisting essentially of:
      (a) $SiO_2$ or
      (b) $SiO_2$ and a metallic dopant, said metallic dopant selected from the group consisting of titanium, zirconium, zinc, aluminum, indium, lead, tungsten, copper, tin, chromium, iron, manganese, antimony, cobalt, barium, and magnesium, wherein said metallic dopant comprises about 0.5% to about 30% of said second layer based on the total weight of said second layer, and wherein said second layer is at least 20 nm thick; said process comprising, in order:
   (1) depositing said first barrier layer on said first surface of said optical waveguide device; and
   (2) depositing said second barrier layer on said second surface of said first barrier layer.

12. The process of claim 11, wherein said first layer and said second layer are deposited by vacuum deposition.

13. The process of claim 12, wherein said layers are deposited in a batch process.

14. The process of claim 12, wherein said layers are deposited in a continuous process.

15. The process of claim 11, additionally comprising the step of adhering a protective layer to said third surface of said second protective layer.

* * * * *